(12) United States Patent
Barrett et al.

(10) Patent No.: US 9,330,467 B2
(45) Date of Patent: May 3, 2016

(54) TIMING SYSTEM AND METHOD

(71) Applicant: Mobii Systems (Pty) Ltd, Bellville (ZA)

(72) Inventors: Roderick Barrett, Protea Valley (ZA);
Brendan Barrett, Durbanville (ZA);
Michael Don Thacker, Durbanville (ZA); Patrick Alex Burls, Cape Town (ZA)

(73) Assignee: Mobii Systems (Pty) Ltd, Bellville (ZA)

( * ) Notice: Subject to any disclaimer, the term of this patent is extended or adjusted under 35 U.S.C. 154(b) by 77 days.

(21) Appl. No.: 14/380,009

(22) PCT Filed: Feb. 20, 2013

(86) PCT No.: PCT/ZA2013/000006
§ 371 (c)(1),
(2) Date: Aug. 20, 2014

(87) PCT Pub. No.: WO2013/126931
PCT Pub. Date: Aug. 29, 2013

(65) Prior Publication Data
US 2015/0043776 A1 Feb. 12, 2015

(30) Foreign Application Priority Data

Feb. 22, 2012 (ZA) .................................. 2012/1311
Sep. 5, 2012 (ZA) .................................. 2012/6653

(51) Int. Cl.
*G06K 9/00* (2006.01)
*G06T 7/00* (2006.01)
(52) U.S. Cl.
CPC ..... *G06T 7/0044* (2013.01); *G06T 2207/30204* (2013.01); *G06T 2207/30221* (2013.01)

(58) Field of Classification Search
CPC ........ H04N 7/188; G06T 7/0044; G06T 7/20;
G06T 7/204; G06T 2207/30204; G06T
2207/30221; G06T 2207/30236; G06T
2207/30241; G06K 9/00; G06K 9/00369;
G06K 2209/23; A63B 24/0021; A63B
2220/10; A63B 2220/30; A63B 2220/62;
A63B 2220/806; A63B 2220/836; A63B
2024/0025; A63B 2225/15; A63B 2225/20;
A63B 2225/54; G01S 13/878; G07C 1/24
See application file for complete search history.

(56) References Cited

U.S. PATENT DOCUMENTS

| 5,493,331 A | 2/1996 | Takahashi et al. |
| 6,104,864 A * | 8/2000 | Kondo ................... H04N 7/188 348/137 |
| 8,107,679 B2 | 1/2012 | Yoda |

(Continued)

FOREIGN PATENT DOCUMENTS

EP 0805595 11/1997

OTHER PUBLICATIONS

Search Report issued in priority application, publication No. PCT/ZA2013/000006.

*Primary Examiner* — Jose Couso
(74) *Attorney, Agent, or Firm* — Haugen Law Firm PLLP

(57) ABSTRACT

A timing system that includes a glyph associated with an object to be timed and at least one camera for capturing images of the glyph or associated object. A computer generates a virtual line, associates the virtual line with at least one of the images, and determines when the glyph or associated object intersects, crosses or has crossed the virtual line. A database records the identity of the glyph and the time that the glyph or associated object intersected or crossed the virtual line. The invention also relates to a related method for determining the time a glyph or object associated therewith passes a predetermined point or line.

17 Claims, 1 Drawing Sheet

(56) References Cited

U.S. PATENT DOCUMENTS 8,456,527 B2 * 6/2013 Elangovan ............ G06K 9/6202
 348/142
2011/0169959 A1 7/2011 Deangelis et al.
2014/0052279 A1 * 2/2014 Van Rens ............ A63B 24/0021
 700/91

* cited by examiner

TIMING SYSTEM AND METHOD

BACKGROUND

The present invention relates to a timing system and method using video images to determine the time an object crosses a predetermined point or line.

Various systems for timing participants in a race and vehicles passing under a toll system are known.

Race events often employ RFID systems for recording the time that participants cross the finish line. However, RFID systems have their drawbacks: they are expensive, complicated to set up; and not suitable for all events (such as canoeing).

Horse racing has adopted image recording technology. A camera is setup in-line with the finish line and a line corresponding with the finish line is superimposed on the image. Time keepers use these images to determine the frame (and therefore the time) in which each horse crosses the finish line. However, the time keepers must then manually identify each horse and assign a finishing time to it.

Movement recording systems using glyphs are common in vehicle management systems. Glyphs attached to cars are picked up by cameras and the fact that the cars have passed a certain point is recorded. However, such systems do not accurately record the time that the glyph (or an object associated with the glyph) passes a predetermined point or line.

The timing system and method according to the present invention aims to address these drawbacks by determining and recording when glyphs (or objects associated with the glyphs) pass a virtual line. Furthermore, the present invention improves the accuracy of determining when glyphs (or objects associated with the glyphs) pass a virtual line by calculating the average acceleration of the glyphs (or objects associated with the glyphs) in the vicinity of the virtual line and using such average acceleration to determine the time that the glyphs (or objects associated with the glyphs) passes the virtual line.

SUMMARY OF THE INVENTION

According to a first aspect of the present invention there is provided a timing system that includes:
- a glyph associated with an object to be timed;
- at least one camera for capturing images of the glyph or associated object;
- a computer that:
  - generates a virtual line;
  - associates the virtual line with at least one of the images; and
  - determines when the glyph or associated object intersects, crosses or has crossed the virtual line; and
- a database that records the identity of the glyph and the time that the glyph or associated object intersected or crossed the virtual line.

Preferably, the system further includes at least two markers that are captured in the images and used by the computer to create the virtual line.

Optionally, the at least one camera is mobile, provided that it captures the at least two markers in its images.

Typically, the computer defines an outline for the associated object and determines when the outline intersects, crosses or has crossed the virtual line.

Generally, the system further includes a lighting system for illuminating the glyph to improve the images captured by the at least one camera. Preferably, the lighting system emits UV or infrared light and at least one camera includes a UV or infra-red filter.

Typically, the system utilises a plurality of cameras to capture a plurality of images and the computer processes the times that the glyph or associated object intersects, crosses or has crossed the virtual line on each of the plurality of images to arrive at a single time.

Preferably, the at least one camera captures: (i) a first image of the object before the object crosses the virtual line; (ii) a second image of the object after the object crosses the virtual line; and (iii) a third image of the object taken before the first image, taken after the second image or taken while the object crosses the virtual line. More preferably, the third image is captured before the first image.

Generally, the computer uses the three images to calculate the average acceleration of the object in the vicinity of the virtual line.

Typically, the computer has regard to:
(i) the distance of the object from the virtual line in the first image;
(ii) the time that the first image was taken;
(iii) the distance of the object from the virtual line in the second image;
(iv) the time that the second image was taken;
(v) the distance of the object from the virtual line in the third image;
(vi) the time that the third image was taken; and
(vii) the average acceleration of the object, as calculated from the three images, to calculate the time that the object crossed the line.

According to a second aspect of the invention, there is provided a method for determining the time a glyph or object associated therewith passes a predetermined point or line, the method includes the steps of:
- capturing images of the glyph or associated object;
- associating a virtual line with at least one of the images;
- determining when the glyph or associated object intersects, crosses or has crossed the virtual line; and
- storing the identity of the glyph and the time that the glyph or associated object intersects or crosses the virtual line in a database.

Preferably, the timing method further includes the step of creating the virtual line by linking at least two markers that are captured in the images.

Typically, the timing method further includes the step of defining an outline for the associated object and determining when the outline intersects, crosses or has crossed the virtual line.

Optionally, the timing method further includes the step of illuminating the glyph to improve the quality of the images. Preferably, the glyph is illuminated in UV or infrared light and at least one camera includes a UV or infrared filter.

Generally, the images are created by a plurality of cameras and the time at which the glyph or associated object intersects, crosses or has crossed the virtual line is calculated by processing the corresponding times determined from the images of each camera.

Preferably, the step of capturing images of the glyph or associated object includes capturing at least: (i) a first image of the object before the object crosses the virtual line; (ii) a second image of the object after the object crosses the virtual line; and (iii) a third image of the object taken before the first image, taken after the second image or taken while the object crosses the virtual line. More preferably, the third image of the object is captured before the first image.

Generally, the step of determining when the glyph or associated object intersects, crosses or has crossed the virtual line includes the step of using the three images to calculate the average acceleration of the object in the vicinity of the virtual line.

Typically, the step of determining when the glyph or associated object intersects, crosses or has crossed the virtual line has regard to the following inputs:
(i) the distance of the object from the virtual line in the first image;
(ii) the time that the first image was taken;
(iii) the distance of the object from the virtual line in the second image;
(iv) the time that the second image was taken;
(viii) the distance of the object from the virtual line in the third image;
(v) the time that the third image was taken; and
(vi) the average acceleration of the object, as calculated from the three images.

BRIEF DESCRIPTION OF THE DRAWINGS

The invention will now be described in more detail, by way of example only, with reference to the accompanying drawings in which.

DESCRIPTION OF THE INVENTION

Figure 1:
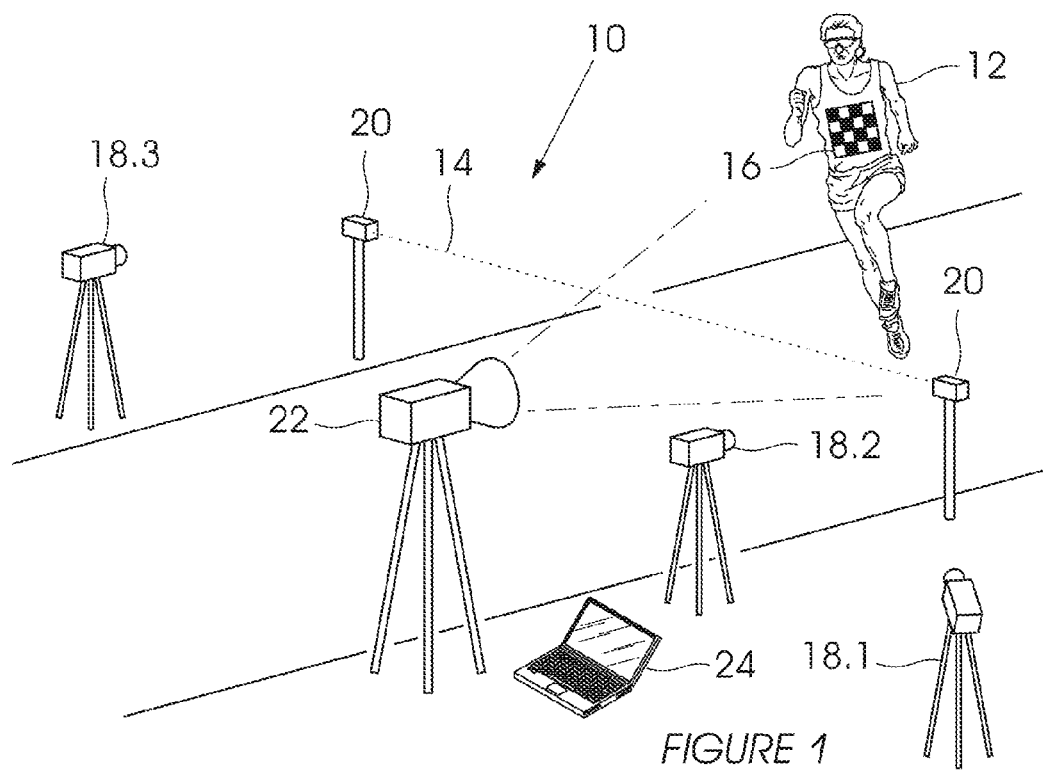
FIG. 1 is an image of a runner with glyph approaching the end of a race according to a first aspect of the invention.

With reference to FIG. 1, according to a first aspect of the invention a timing system 10 is provided for determining the time that an object 12 crosses a predetermined point or line 14.

Figure 2:
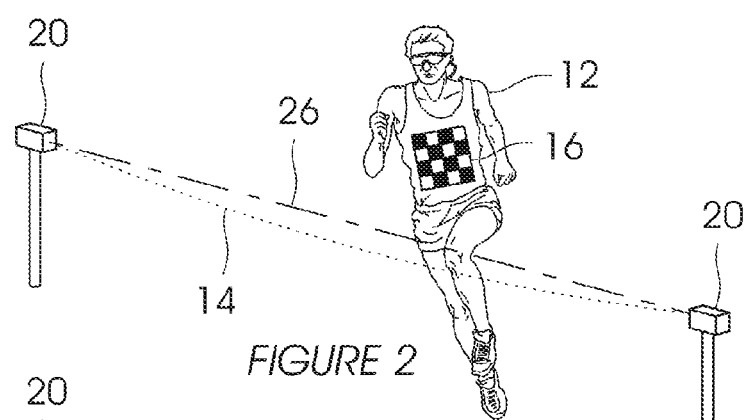
FIG. 2 is a computer processed image of the glyph in FIG. 1 and a virtual line generated by the timing system according to the present invention.
Figure 3:
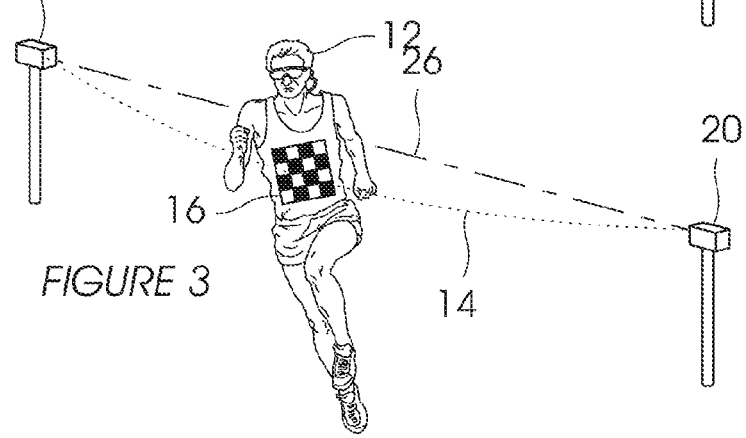
FIG. 3 is the computer processed image of the runner in FIG. 1 crossing the finish line.

The object could be a motor vehicle, runner, cyclist, kayaker, canoeist, boat or any other mobile object. By way of example, FIGS. 1 to 3 show the object 12 in the form of a runner nearing the end of a running race.

The timing system 10 requires the runner 12 to wear a glyph 16—a unique image designed to be recognised easily by image recognition software. FIGS. 1 to 3 shows the glyph 16 attached to the runner's 12 bib. However, this could be associated with any mobile object in any other way, such as being stuck or painted directly onto a motor vehicle, placed on the front of a mountain bike, etc. Furthermore, it will be appreciated that the glyph 16 could be any other type of unique identifier, such as the race number on a bib, or the custom designed colour print of "43" on a race vehicle.

Video cameras 18 are located near the finish line 14. A camera 18.1 is aligned with the finish line 14, whereas other cameras 18.2 and 18.3 are located beyond, directed towards and elevate relative to the finish line 14. The frame rate of the cameras 18 depends on the speed of object 12 to be timed—the faster the object 12, the higher the required frame rate. Where objects travel linearly at speed (i.e. motor vehicles), the glyph preferably comprises lines (e.g. bar code lines) extending in the direction of travel spaced from each other perpendicular to the direction of travel. Such an arrangement ameliorates the impact of burred images of the object 12 on glyph 16 identification.

The object 12 associated with a glyph 16 is identified by monitoring changes in the camera image pixel colours in the vicinity of the glyph 16. Further processing of such image data could also remove unwanted features (e.g. shadows).

The finish line 14 includes two markers 20 at its ends. Typically, these markers 20 are of a specific colour and are picked up in the images captured by the cameras 18.

To improve the images of the glyphs 16 and markers 20 captured by the video cameras 18, a lighting system 22 is trained on the finish line 14. The lighting system 22 casts UV or infrared light towards objects 12 approaching the finish line 14 and at least one video camera 18 includes a UV or infrared filter. The light emitted by the lighting system 22 could automatically be adjusted using image feedback of a reference glyph (not shown).

With reference to FIGS. 2 and 3, the images captured by the video cameras 18 are fed to a computer 24. The computer 24 runs software (not shown) that identifies the markers 20 associated with the finish line 14 and generates a virtual line 26 that corresponds with the undistorted position of the actual finish line 14. The virtual line 26 is then associated with the images. The software identifies the glyph 16 and records the time that the glyph 16 intersects, crosses or has crossed the virtual line 26 (i.e. the finish time).

Example—calculation of finishing time from two images showing an object crossing a finish line:

Frame 1 absolute time: 1:23.435
Frame 2 absolute time: 1:23.500

$$\text{Total Time} = \text{Frame 2 Time} - \text{Frame 1 Time} = 1{:}23.500 - 1{:}23.435 = 0.065$$

X (distance from frame 1 common point to timing line): 400 pixels
Y (distance from frame 1 common point to timing line): 100 pixels $$\text{Total Distance Travelled: } X + Y = 400 + 100 = 500 \text{ pixels}$$

$$X \text{ ratio: } 400/500 = 0.8$$

$$Y \text{ ratio: } 100/500 = 0.1$$

$$\text{Frame 1 time to Timing Line} = 0.8/0.065 = 0.0123076923$$

$$\text{Intersect Time} = \text{Frame 1 absolute time} + \text{Frame 1 time to Timing Line} = 1{:}23.435 + 0.0123076923 = 1{:}23.4473$$

To calculate the time that the runner 12 crosses the virtual line 26 more accurately, the cameras 18 capture:
(i) a first image of the object before the runner 12 crosses the virtual line 26;
(ii) a second image of the runner 12 after the runner 12 crosses the virtual line 26; and
(iii) a third image of the runner 12 of the object taken before the first image, taken after the second image or taken while the object crosses the virtual line. Preferably, the third image is captured before the first image.

The computer 24 uses calibrated markers captured in the first, second and third images (e.g. lines painted on the racetrack a known distance from the finish line 14) to determine the distance of the runner 12 from the virtual line 26. Alternatively, the computer 24 could calculate distances by counting pixels between the runner 12 in the various frames and the virtual line 26.

The computer 24 then uses the three images to calculate the average acceleration of the runner 12 in the vicinity of the finish line 14/virtual line 26. And, has regard to the following inputs to calculate a more accurate time that the runner 12 crosses the virtual line 26:

(i) the distance of the runner 12 from the finish line 14 in the first image;
(ii) the time that the first image was taken;
(iii) the distance of the runner 12 from the virtual line 26 in the second image;
(iv) the time that the second image was taken;
(v) the distance of the object from the virtual line in the third image;
(vi) the time that the third image was taken; and
(vii) the average acceleration of the runner, as calculated from the three images, The method of calculating the time that the runner 12 crosses the virtual line 26 is explained in more detail below, using the following kinematic equations:

$$v = \frac{d_1 - d_0}{t_1 - t_0} \quad \text{(i)}$$

$$a = \frac{v_1 - v_0}{t_1 - t_0} \quad \text{(ii)}$$

$$v_1^2 = v_0^2 + 2a(d_1 - d_0) \quad \text{(iii)}$$

Where t is relative time, d is the relative position, v is the velocity and a is the constant acceleration of the object.

The following time line illustrates the order of the images/samples (S1, S2 and S3) and a calculated image/sample (Sx) of the runner 12 crossing the virtual line 26.

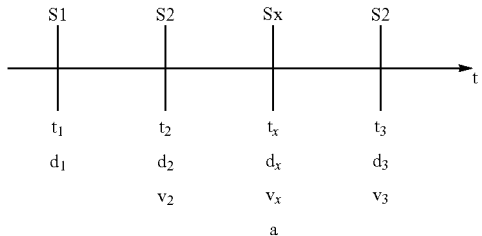

Using the change in position of the runner 12 between S1 and S2, the velocity of the runner 12 at S2 ($v_2$) can be calculated. For example:

$$v_2 = \frac{d_2 - d_1}{t_2 - t_1} \text{ using (i)}$$

Using the change in position of the runner 12 between S2 and S3, the velocity of the runner 12 at S3 ($v_3$) can be calculated. For example:

$$v_3 = \frac{d_3 - d_2}{t_3 - t_2} \text{ using (i)}$$

Using the change in velocity of the runner 12 between S2 and S3, the constant acceleration of the runner 12 while crossing the virtual line 26 can be determined. For example:

$$a = \frac{v_3 - v_2}{t_3 - t_2} \text{ using (ii)}$$

Using the position, time and velocity of the runner 12 at S2, the constant acceleration of the runner 12 and the position of the virtual line 26, the time of the runner 12 at the virtual line 26 can be determined. For example:

$$v_x = \sqrt{v_2^2 + 2a(d_x - d_2)} \text{ using (iii)}$$

$$t_x = \frac{v_x - v_2}{a} + t_2 \text{ using (ii)}$$

When the time that the runner 12 has crossed the virtual line 26 has been calculated, the identity of the glyph 16 and the finish time is stored in a database (not shown). Optionally, the database may also store a series of video images of the object 12 crossing the finish line 14.

In more accurate applications, the software identifies the glyph 16, selects the object 12 associated with the glyph 16, and generates an outline of the object 12. The software then tracks movement of such outline towards the virtual line 26 and records the time that such outline intersects, crosses or has crossed the virtual line 26.

Since the software generates the virtual line 26 from the markers and uses it to determine the finish time, the video cameras 18 need not be stationary. They can be mobile, provided that the images captured by the cameras 18 include the markers 20.

It will be appreciated that a linear finish line 14 requires two markers 20. A non-linear finish line 14 requires additional markers 20 for the software to generate a virtual line 26 that corresponds with the shape of the finish line 14. Furthermore, to improve accuracy and reduce the impact of objects 12 that impede the line of sight of other objects 12, various video cameras 18 can be trained on the finish line 14. The computer 24 calculates a finishing time for each camera 18 using the series of images received from that camera 18. Outliers are discarded and an average finishing time is calculated. By averaging the finishing times calculated using images from various video cameras 18, the timing system 10 can utilise cameras 18 with lower frame rates than would otherwise be required.

According to a second aspect of the invention, a method for determining the time a glyph 16 or object 12 associated therewith passes a finish line 14 (as per the system described above) includes the steps of:

illuminating the glyph 16 and markers with UV or infrared light from a lighting system 22;
capturing images of the glyph 16 or associated object 12 and markers 20 via the video cameras 18 including:
capturing at least: (i) a first image of the object 12 before the object 12 crosses the virtual line 26; (ii) a second image of the object 12 after the object crosses the virtual line 26; and (iii) a third image of the object taken before the first image, taken after the second image or taken while the object crosses the virtual line;
generating a virtual line 26 using the markers 20 on the images;
associating the virtual line 26 with the images, the virtual line 26 corresponding with the actual finish line 14 on the images;
optionally defining an outline for the associated object 12;
using the first, second and third images to calculate the average acceleration of the object 12 in the vicinity of the finish line 14/virtual line 26;
determining when the glyph 16, associated object 12 or outline of the associated object 12 intersects, crosses or has crossed the virtual line 26, having regard to the following inputs: (i) the distance of the object 12 from the virtual line 26 in the first image; (ii) the time that the first image was taken; (iii) the distance of the object 12 from the virtual line 26 in the second image; (iv) the time that the second image was taken; (v) the distance of the object 12 from the virtual line 26 in the third image; (iii) the time that the third image was taken and (vi) the average acceleration of the object 12, as calculated from the three images; and storing the identity of the glyph 16 and the time that the glyph 16 or associated object 12 intersects, crosses or has crossed the virtual line 26 in a database.

The invention claimed is:

1. A timing system including:
    a glyph associated with an object to be timed;
    at least one camera for capturing images of the glyph and associated object;
    a computer that:
        generates a virtual line;
        identifies the glyph;
        defines an outline for the object associated with the glyph;
        associates the virtual line with at least one of the images; and
        determines when the outline of the object associated with the glyph intersects, crosses or has crossed the virtual line; and
    a database that records the identity of the glyph and the time that the outline of the object associated with the glyph intersected or crossed the virtual line.

2. A timing system according to claim 1 further including at least two markers that are captured in the images and used by the computer to create the virtual line.

3. A timing system according to claim 2, wherein the at least one camera is mobile, provided that it captures the at least two markers in its images.

4. A timing system according to claim 3, further including a lighting system for illuminating the glyph to improve the images captured by the at least one camera.

5. A timing system according to claim 4, wherein the lighting system emits UV or infrared light and the at least one camera includes a UV or infrared filter.

6. A liming system according to claim 5, wherein a plurality of cameras capture a plurality of images and the computer processes the times that the outline of the object associated with the glyph intersects, crosses or has crossed the virtual line on each of the plurality of images to arrive at a single time.

7. A timing system according to claim 6, wherein the at least one camera captures: (i) a first image of the object before the object crosses the virtual line; (ii) a second image of the object after the object crosses the virtual line; and (iii) a third image of the object taken before the first image, taken after the second image or taken while the object crosses the virtual line.

8. A timing system according to claim 7, wherein the computer uses the three images to calculate the average acceleration of the object in the vicinity of the virtual line.

9. A timing system according to claim 8, wherein the computer has regard to:
    (i) the distance of the object from the virtual line in the first image;
    (ii) the time that the first image was taken;
    (iii) the distance of the object from the virtual line in the second image;
    (iv) the time that the second image was taken;
    (v) the distance of the object from the virtual line in the third image;
    (vi) the time that the third image was taken; and
    (vii) the average acceleration of the object, as calculated from the three images, to calculate the time that the object crossed the line.

10. A method for determining the time an outline of an object associated with a glyph passes a predetermined point or line including the steps of:
    capturing images of the glyph and associated object;
    associating a virtual line with at least one of the images;
    identifying the glyph;
    defining an outline for the object associated with the glyph;
    determining when the outline of the object associated with the glyph intersects, crosses or has crossed the virtual line; and
    storing the identity of the glyph and the time that the outline of the object associated with the glyph intersects or crosses the virtual line in a database.

11. A timing method according to claim 10, further including the step of creating the virtual line by linking at least two markers that are captured in the images.

12. A timing method according to any one of claims 11 further including the step of illuminating the glyph to improve the quality of the images.

13. A timing method according to claim 12. wherein the glyph is illuminated in UV or infrared light and the at least one camera includes a UV or infrared filter.

14. A timing method according to claim 13, wherein images are created by a plurality of cameras and the time at which the outline of the object associated with the glyph intersects, crosses or has crossed the virtual line is calculated by processing the corresponding times determined from the images of each camera.

15. A timing method according to claim 14, wherein the step of capturing images of the glyph and associated object includes capturing at least: (i) a first image of the object before the object crosses the virtual line; (ii) a second image of the object after the object crosses the virtual line; and (iii) a third image of the object taken before the first image, taken after the second image or taken while the object crosses the virtual line.

16. A timing method according to claim 15, wherein the step of determining when the outline of the object associated with the glyph intersects, crosses or has crossed the virtual line includes the step of using the three images to calculate the average acceleration of the object in the vicinity of the virtual line.

17. A timing method according to claim 16, wherein the step of determining when the outline of the object associated with the glyph intersects, crosses or has crossed the virtual line has regard to the following inputs:
    (i) the distance of the object from the virtual line in the first image;
    (ii) the time that the first image was taken;
    (iii) the distance of the object from the virtual line in the second image;
    (iv) the time that the second image was taken;
    (v) the distance of the object from the virtual line in the third image;
    (vi) the time that the third image was taken; and
    (vii) the average acceleration of the object, as calculated from the three images.

* * * * *